United States Patent
Stone et al.

[11] Patent Number: 6,036,030
[45] Date of Patent: Mar. 14, 2000

[54] METHOD FOR PRODUCING A SELECTIVELY PERMEABLE SEPARATION MODULE

[75] Inventors: Mark L. Stone, Idaho Falls; Christopher J. Orme, Shelley; Eric S. Peterson, Idaho Falls, all of Id.

[73] Assignee: Bechtel BWXT Idaho LLC, Idaho Falls, Id.

[21] Appl. No.: 08/965,654

[22] Filed: Nov. 6, 1997

Related U.S. Application Data

[63] Continuation-in-part of application No. 08/559,103, Nov. 16, 1995, which is a continuation of application No. 08/191,224, Feb. 2, 1994, abandoned.

[51] Int. Cl.[7] .................................................. B01D 29/00
[52] U.S. Cl. .............. 210/490; 210/500.38; 210/500.23; 210/500.41; 210/500.36; 427/245; 264/41
[58] Field of Search .................................... 210/490, 506, 210/500.38, 500.41, 500.23, 323.2, 500.36, 500.29; 427/240–241, 243, 244, 245, 230, 231, 234; 264/41

[56] References Cited

U.S. PATENT DOCUMENTS

| | | | |
|---|---|---|---|
| 4,410,568 | 10/1983 | Iwama et al. | 427/244 |
| 4,698,241 | 10/1987 | Roberson | 427/233 |
| 4,980,235 | 12/1990 | Scheer et al. | 427/243 |
| 5,173,235 | 12/1992 | Kamei et al. | 264/154 |
| 5,212,000 | 5/1993 | Rose et al. | 428/34.7 |

*Primary Examiner*—Ana Fortuna
*Attorney, Agent, or Firm*—Alan D. Kirsch

[57] ABSTRACT

A method and apparatus is provided for casting a polymeric membrane on the inside surface of porous tubes to provide a permeate filter system capable of withstanding hostile operating conditions and having excellent selectivity capabilities. Any polymer in solution, by either solvent means or melt processing means, is capable of being used in the present invention to form a thin polymer membrane having uniform thickness on the inside surface of a porous tube. Multiple tubes configured as a tubular module can also be coated with the polymer solution. By positioning the longitudinal axis of the tubes in a substantially horizontal position and rotating the tube about the longitudinal axis, the polymer solution coats the inside surface of the porous tubes without substantially infiltrating the pores of the porous tubes, thereby providing a permeate filter system having enhanced separation capabilities.

30 Claims, 1 Drawing Sheet

METHOD FOR PRODUCING A SELECTIVELY PERMEABLE SEPARATION MODULE

This is a continuation-in-part of application Ser. No. 08/559,103, filed Nov. 16, 1995, which was a continuation of application Ser. No. 08/191,224, filed Feb. 2, 1994, now abandoned.

CONTRACTUAL ORIGIN OF THE INVENTION

The United States Government has rights in this invention pursuant to Contract No. DE-AC07-76ID01570 between the U.S. Department of Energy and EG&G Idaho, Inc., now Contract No. DE-AC07-94ID13223 between the U.S. Department of Energy and Lockheed Idaho Technologies Company.

BACKGROUND OF THE INVENTION

This invention relates to a method and apparatus for casting a thin polymer film and more particularly to a method of casting a polymeric membrane on the inside surface of porous tubes to provide a permeate separation system having excellent selectivity capabilities.

Several methods for casting a thin dense polymer film are known. For example, a substrate can be dipped in a polymer solution, a polymer solution can be spray cast upon a surface or substrate; an aliquot of a polymer solution can be placed upon a support and the support rotated at high speeds to fling off excess solution; a polymer solution can be dropped onto a high speed rotating flat substrate; a draw down bar can be used; a thin film can be extruded; or a continuous substrate can be exposed to the solution and allowed to drain off. However, none of these methods can be applied effectively to the inside surface of a porous tube.

Current methods for casting polymeric membranes on the inside surface of tubes include simply pouring the polymer solution into the tube and then pouring it back out again, repeating the process as needed. Another method is a pressure system that can be used to force the viscous solution up into the tube and then force the solution back out. These techniques however, do not provide a uniformly thin polymer film thickness and therefore result in an uneven polymer morphology, and accordingly polymeric membranes produced by these current techniques have less desirable permeate selectivity capabilities.

Also, current methods of casting membranes on the inner surfaces of tubes, such as that described in U.S. Pat. No. 4,410,568 of Iwama et al., require that the membrane be physically detached from the tube in which it was cast so that it can be slipped into a perforated stainless steel tube. A disadvantage of this technique is that it is limited to membranes that are physically capable of enduring the detachment from a glass tube and subsequent transfer into a perforated stainless steel tube. Because many useful membranes have a thickness in the range of 1 to 100 microns and therefore cannot be physically manipulated in the manner disclosed in Iwama et al., it is desirable to permanently attach, or adhere, membranes having the desired uniformity and separation capability directly onto the inside surface of a porous tubular support.

It is an object of this invention to provide a method for casting a polymer membrane of uniform thickness on the inside surface of a porous tube.

It is another object of this invention to provide a method for casting a continuous homogeneous polymer membrane on the inside surface of a porous tube to create a semipermeable membrane system having enhanced selectivity capabilities.

It is still a further object of this invention to provide a method for producing an energy efficient permeate separation having excellent selectivity capabilities.

Additional objects, advantages and novel features of the invention will become apparent to those skilled in the art upon examination of the following and by practice of the invention.

SUMMARY OF THE INVENTION

To achieve the foregoing and other objects, a method and apparatus for casting polymeric membranes on the inside surface of porous tubes is provided. According to the method of the present invention, a porous tube having a cap at one end to completely seal that end of the tube is filled with a polymeric solution. The other end of the tube in then sealed by a cap. By sealing the polymeric solution within the tube by the two end caps, the polymeric solution evaporates through the porous walls of the tube to create a polymer film having a uniform thickness on the inside surface of the porous wall tube. Once inside the tube, it is undesirable to have the polymer solution in contact with the ambient atmosphere since this would result in the solution evaporating through the ends of the tube rather than through the porous walls.

In one embodiment of the invention, the polymer is in solution by means of a solvent capable of dissolving the polymer into a liquid solution. In another embodiment of the invention, the polymer is in a liquid solution by elevating the temperature above the melting point for the polymer. It should be appreciated that any polymer capable of being in solution can be used in the present invention.

A predetermined amount of the polymer solution is poured into the capped porous tube and the other end of the tube is then also capped. The capped porous tube is then aligned and leveled along the longitudinal axis of the tube and rotated slowly. By slowly rotating the tube, the polymer solution evenly coats the inside surface of the porous tube. If the tube is rotated too rapidly, the polymer solution may infiltrate the pores of the polymer tube, thereby resulting in a permeate filter system having less desirable separation characteristics than those observed when using the filter system formed by the present invention.

In another embodiment of the present invention, multiple porous tubes can be configured in close physical proximity to one another to form a multiple tube module, hereinafter referred to as a tubular module. According to this embodiment of the invention, all of the porous tubes of the tubular module are capped at one end and then filled with the polymer solution. The opposite end of each porous tube of the tubular module is then capped and the entire tubular module is aligned and leveled about the longitudinal axis of the tubular module and the rotated slowly about the tubular module longitudinal axis. The tubular module create by the method of the present invention can be utilized for acid-gas, organic-water, and organic-organic separations under conditions heretofore not conducive to membrane separation techniques.

BRIEF DESCRIPTION OF THE DRAWINGS

The present invention is illustrated in the accompanying drawings where.

DETAILED DESCRIPTION OF THE INVENTION

Figure 1:
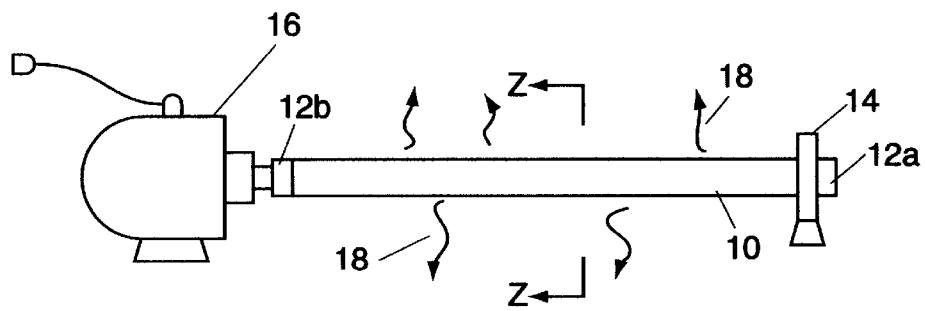
FIG. 1 is an elevational view of the system for rotating the porous tube to form a thin film.

Referring to FIG. 1, a preferred embodiment of the invention is shown. Porous tube 10 is capped at one end by cap 12a and filled with a polymer solution. Preferably the polymer solution is comprised of one or more of the following polymers or copolymers: polyphosphazenes; polyacetals; polyacrylics; polyacrylonitriles; polyallylics; polycellulosics; polyepoxies; polyethylene vinyl alcohols; polyfluoro plastics; poly-furans; polyiononmers; polyketones; polyphenolics, especially polymelamine phenolics; polyamides, such as nylon and polyphthalamide; polycarbonates; polydicyclopentadienes; polyesters, in the form of thermosets or thermoplastics; polyimides, such as polyetherimides; polyethylene and ethylene copolymers; polypheylenesulfide; polypropylene; polystyrene and styrene copolymers such as acrylonitrile-butadienestyrene and other vinyl polymers and copolymers; polyurethanes, in the form of thermosets or thermoplastics; polysilicones, such as polysiloxanes and silicone rubbers, polysulfones; thermoplastic elastomers; and polyureas.

In one embodiment of the invention, the polymer solution is a high molecular weight polymer dissolved in a volatile solvent. Examples of volatile solvents capable of dissolving the polymer include, water, tetrahydrofuran (THF); alcohols, such as methanol, ethanol, isopropanol, propanol and butanol; ketones, such as acetone, methyl ethyl ketone, methyl isobutyl ketone, and cyclohexanone; esters, such as methyl acetate, butyl acetate, ethyl acetate, and methyl ethyl acetate; chlorinated hydrocarbons, such as chloroform, dichloromethane, carbon tetracholorethane and methylene chloride; other hydrocarbons, such as ethane, cyclohexane, hexane, benzene, styrene, dichlorobenzene, toluene and xylene, aldehydes; acids, such as acetic acid; and aqueous bases.

In another embodiment, the polymer solution can be created by heating the polymer above its melting point. It should be appreciated that any polymer capable of being in solution, by either solvent means or by melt processing means, can be used in the present invention to cast a polymeric membrane inside a porous tube.

Figure 2:
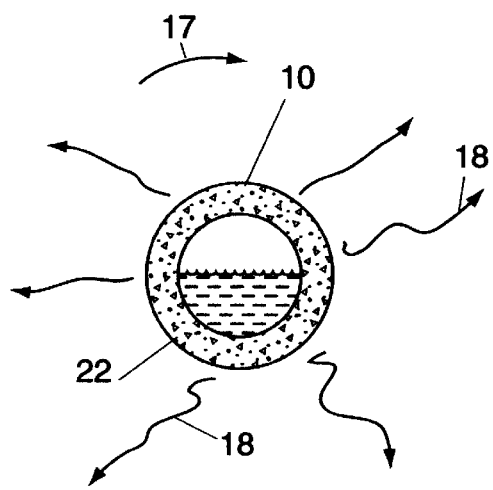
FIG. 2 is an enlarged cross-section view of the porous tube containing the fluid and polymer, taken through lines 2—2 of FIG. 1.

Porous tube 10 provides a rigid support for the polymer film and is comprised of a chemically inert material having thermal stability, such as metals, ceramics, carbon, glass, plastics or polymers. Most preferably the porous material comprising tube 10 has pores small enough to maintain the polymer on the surface of the tube rather than infiltrating the porous tube material. Pore sizes in the range of 40 Å to 1.0 μm have been found to be desirable. However, an advantage of the present invention is that, because of the relatively slow rotation speed used in the present invention, larger pore sizes can also be used effectively. By using larger pore sizes, transport of the process stream through the substrate is less energy intensive. Also, the porous tube 10 as shown in FIG. 2 can be comprised of an outer course aggregate 22 and a thin inner fine-aggregate material having smaller pores. The fine inner aggregate permits forming thin, yet dense lines of polymer as the volatile fluid permeates the porous tube.

The filled porous tube 10 has caps 12a and 12b at each end and is supported by a bearing 14 at one end and a variable-speed geared-down motor 16 at a second end. As shown in FIG. 1, bearing 14 maintains porous tube 10 in a substantially horizontal position. It is important that the tube be positioned in a substantially horizontal position to insure an even coating of polymer on the inner tube surface. The motor 16 rotates the tube slowly about the tube's longitudinal axis. Preferably the rotation speed is in the range of about 1 to 60 RPM. Most preferably the rotation speed is less than 10 RPM. Applicant has discovered that when the tube is rotated at too high of speed, the polymer solution has a tendency to infiltrate the porous tube substrate to a greater extent, and thereby results in a permeate filter system having less desirable separation capabilities.

When the polymer solution is created by using solvents, the porous tube is rotated until solvent evaporation through porous tube 10 is completed. The partially filled porous tube is illustrated in FIG. 2, showing evaporation vapors 18. Evaporation completion is noted by monitoring the tube temperature. While evaporation occurs, the tube surface will be below room temperature. Upon completion, the tube will return to room temperature. The evaporation process generally takes on the order of 2–3 hours.

When the polymer solution is formed by melting the polymer, the partially filled porous tube is rotated and the tube surface temperature is monitored. Completion of the process is noted when the temperature of the tube surface drops to below the polymer melting point or to room temperature. In an alternate embodiment of the present invention, means can also be provided for heating or cooling the porous tube to enhance the evaporation or cooling of the polymer solution within the porous tube.

Figure 3:
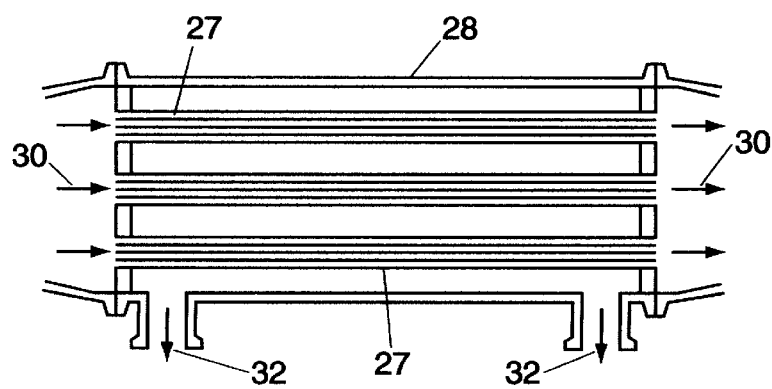
FIG. 3 is a side section view of a multiple tube filter, showing an application for the coated tube.

The method of the present invention is particularly advantageous for preparing modules containing multiple tubes or channels as shown in FIG. 3. Multiple parallel channels 27 can be fabricated within a pressurized housing 28 as seen in FIG. 3 to form a permeate filter system. The permeate is separated from the carrier fluid 30 and exits the housing at 32. To form the multiple tubular module, one end of the housing is capped and the multiple tubes within the module are filled with a predetermined amount of the polymer solution. The entire module is slowly rotated as previously described until either evaporation is complete, or until the polymer solution temperature drops below its melting temperature. This method provides a polymer membrane having a uniform thickness throughout the various multiple tubes within the module.

Industrial applications of porous tubes or tubular modules having polymeric membranes cast according to the present invention include azeotrope breaking, separation of carbon dioxide from well gas, process stream clean up, dehydration of products, acid gas removal/separation and organic-organic separations. Applicants have conducted various separation tests to determine separation characteristics of the porous tubes and modules of the present invention. These experimental studies and the results obtained from the studies are described below.

Experimental Studies

In experimental studies, a polymer solution of 4% by weight of ORGAFLEX (a registered trademark of Elf ATOCHEM, S.A.) was added to a THF solution. THF, as used in experiments, is a water-white liquid with an ethereal odor, a density of 0.888, a flash point of −65° C., and that is soluble in water and organic solvents. The phosphazene, as used in laboratory experiments is a ring or chain polymer that contains alternating phosphorus and nitrogen atoms with two substitutes on each phosphorus atom.

The preferred mixture of polyphosphazene polymer in THF is between 1 and 10% by weight of polymer in THF. The film thicknesses deposited are between 0.5 $\mu$m and 200 $\mu$m, typically 20–50 $\mu$m. Improved films can be obtained also by adding a cross-linking agent to the solvent and polymer, i.e., benzoyl peroxide. On completing the rotation, the tube and polymer coating are heated to about 200° C. for about 5 minutes to effect the cross-linking. Cross-linking has the effect of changing a plastic from a thermoplastic to a thermosetting plastic. Thus, it increases strength, heat and electrical resistance, and especially, resistance to solvents and other chemicals.

The tubes 10 as used in the experimental tests were fabricated from alpha and gamma alumina and have an internal diameter (ID) of about 5 mm. A 0.2 $\mu$m pore size ceramic tube was filled with the solution, capped, and mounted between a bearing and a slow-speed motor. The tube was carefully leveled by means of an air bubble level and then rotated until the solvent was totally evaporated by permeation through the porous tube leaving behind a polymer-lined porous tube. Lining thicknesses ranged from about 15 to 190 $\mu$m. Leak testing of the lining was then performed by pressurizing the tube with 40 psi nitrogen and monitoring for leakage. In other sets of experiments, the final polymer thicknesses obtained were between 3 and 5 $\mu$m.

Applicants' experimental studies have indicated that the polyphosphazene polymers membranes coated on the inside of porous tubular supports are capable of withstanding rigorous processing conditions which most other polymer membranes will not tolerate. Applicants have conducted pervaporation studies using various polymer membranes cast according to the present invention. Separation factors ($\alpha$, or enhancement factors) were calculated from the ratio of gas/vapor concentrations in the feed and the ratio of the gas/vapor concentrations in the permeate, as illustrated by Equation (1).

$$\alpha = \frac{\frac{[A]_{permeate}}{[B]_{permeate}}}{\frac{[A]_{feed}}{[B]_{feed}}} \quad (1)$$

where A and B represent the chemical constituents of the feed stream.

Applicants conducted experimental studies using various concentrations of polyphosphazene polymers (Z-1002-A; Elf Atochem, S.A.) crosslinked with benzoyl peroxide (1 to 3% concentration). These study results are shown in Table 1 for the separation of methylene chloride from water via pervaporation, and generally indicate the method of the present invention produces membrane units having enhanced separation factors under various operating conditions.

TABLE 1

| % Polymer in Solution | Feed Flow (ml/min) | Temp | Pressure (mm Hg) | Flux (1/m²-hr) | Separation Factor |
|---|---|---|---|---|---|
| 2.5 | 65 | room | 132 | 0.04 | 64 |
| 4.0 | 50 | room | 147 | 0.01 | 9900 |
| 5.0 | 80 | room | 132 | 0.12 | 198 |
| 8.0 | 85 | room | 142 | 0.02 | 396 |

The results of testing poly[bis(phenoxy)phosphazene] membranes for the removal of methylene chloride (1%) from water (99%) are shown in Table 2, below.

TABLE 2

| Feed Flow (ml/min.) | Temperature °C. | Pressure (mm Hg) | Flux 1/m²-hr | Separation Factor |
|---|---|---|---|---|
| 55.0 | 24 | 140 | 0.39 | 3000 |
| 50.0 | 24 | 140 | 0.25 | 3600 |
| 50.0 | 45 | 140 | — | 9000 |
| 50.0 | 60 | 140 | 0.35 | 8800 |
| 35.0 | 80 | 140 | 0.38 | 3000 |
| 40.0 | 70 | 140 | 0.45 | N/R |
| 50 | 75 | 140 | 0.45 | $\alpha$* |

N/R = Not recorded
*$\alpha$ = only methylene chloride was observed in the permeate As seen in Table 2, the separation factors varied from 3000 to 9000. The data indicate that the separation factors are independent of feed temperature and feed flow rate with constant permeate pressures. As expected the fluxes are directly dependent upon feed temperature.

Other experimental studies demonstrated the successful separation of water from ethylene glycol using a polyphosphazene (Z-1002-A) membrane produced according to the present invention. In these studies, all runs were performed at 22° C. in a pervaporation scheme. The results of these studies are shown in Table 3.

TABLE 3

| Feed Flow (ml/min.) | Vacuum Pressure (mm Hg) | Flux (1/m²-hr) |
|---|---|---|
| 75 | 44 | 0.07 |
| 75 | 44 | 0.07 |
| 75 | 37 | 0.07 |
| 75 | 32 | 0.08 |
| 75 | 32 | 0.08 |
| 75 | 32 | 0.10 |
| 75 | 32 | 0.10 |
| 75 | 32 | 0.09 |
| 75 | 32 | 0.09 |
| 75 | 32 | 0.10 |
| 75 | 32 | 0.10 |

Cross-linked polyphosphazene membranes cast according to the method of the present invention ere tested for isopropyl alcohol/water separation capabilities, the results of which are shown in Table 4.

TABLE 4

| Feed Flow (ml/min) | Temperature °C. | Pressure (mm Hg) | Flux (1/m²-hr) |
|---|---|---|---|
| 70 | 22 | 5 | 0.1 |
| 70 | 87 | 5 | 5.7 |

TABLE 4-continued

| Feed Flow (ml/min) | Temperature °C. | Pressure (mm Hg) | Flux (1/m²-hr) |
|---|---|---|---|
| 70 | 88 | 5 | 17.1 |
| 70 | 90 | 5 | 11.5 |

It was noted in other experimental studies that for feed streams containing significant amounts of basic components (e.g., NaOH or LiOH), the cross-linked polyphosphazene coated porous supports offer chemical stability which is unequalled by either polyvinyl alcohol or dimethylsiloxane.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for casting a polymeric membrane on the inside surface of a porous wall tube to create a permeate separation system, the steps comprising:
   (a) forming a polymer solution consisting of a polymer dissolved in a liquid solvent;
   (b) pouring the polymer solution into the porous tube, said porous wall tube having a cap at one end;
   (c) capping the other end of the porous wall tube so that the polymer solution is sealed within the porous tube;
   (d) aligning the longitudinal axis of the porous tube in a substantially horizontal position;
   (e) rotating the aligned porous tube about its longitudinal axis at a speed of less than 60 revolutions per minute so that the polymer solution solvent evaporates through the porous wall tube to provide a polymer film having a uniform thickness on the inside surface of the porous wall tube, the polymer film and porous wall tube thereby constituting the permeate separation system.

2. The method of claim 1 wherein the polymer is selected from the group comprised of polyphosphazenes, polyacetals, polyacrylics, polyacrylonitriles, polyallylics, polycellulosics, polyepoxies, polyethylene vinyl alcohols, polyfluoro plastics, poly-furans, polyiononmers, polyketones, polyphenolics, polyamides, polycarbonates, polydicyclopentadienes, polyesters, polyimides, polyethylene, ethylene copolymers, polypheylenesulfide, polypropylene, polystyrene, styrene copolymers, polyurethanes, polysilicones, polysulfones, thermoplastic elastomers, and polyureas.

3. The method of claim 1 wherein the polymer solution is formed by using a solvent selected from the group comprised of water tetrahydrofuran, alcohols, ketones, esters, chlorinated hydrocarbons, ethane, cyclohexane, hexane, benzene, styrene, dichlorobenzene, toluene, xylene, aldehydes, aqueous acids and bases.

4. The method of claim 3 further comprising the step of monitoring the temperature of the porous tube and stopping the rotation of the porous tube after the temperature of the porous tube substantially equals the ambient temperature.

5. The method of claim 1 wherein the polymer solution is formed by heating the polymer above its melting point.

6. The method of claim 1 wherein the porous tube is comprised of a material selected from the group comprised of metals, ceramics, carbon, glass, plastics and polymers.

7. The method of claim 1 wherein the inside surface of the porous tube has pores less than 1.0 $\mu$m in diameter.

8. The method of claim 1 wherein the rotation speed of the porous tube is less than 10 revolutions per minute.

9. The method of claim 1 wherein the polymer film coating on the inside of the porous tube has a uniform thickness in the range of 0.5 $\mu$m to 200 $\mu$m.

10. The method of claim 1 wherein the polymer film coating on the inside of the porous tube has a uniform thickness in the range of 20 $\mu$m to 50 $\mu$m.

11. A method for casting a polymeric membrane on the inside surface of multiple porous wall tubes of a tubular module to create a permeate separation system, the steps comprising:
   (a) forming a polymer solution consisting of a polymer dissolved in a liquid solvent;
   (b) pouring the polymer solution into the porous tubes of a tubular module, said porous tubes having a cap at one end;
   (c) capping the other end of the porous wall tubes so that the polymer solution is sealed within the porous tubes;
   (d) aligning the longitudinal axis of the tubular module in a substantially horizontal position;
   (e) rotating the aligned tubular module about its longitudinal axis at a speed of less than 60 revolutions per minute so that the polymer solution solvent evaporates through the porous wall tubes to provide a polymer film having a uniform thickness on the inside surface of the porous wall tubes, the polymer film and porous wall tubes thereby constituting the permeate separation system.

12. The method of claim 11 wherein the polymer is selected from the group comprised of polyphosphazenes, polyacetals, polyacrylics, polyacrylonitriles, polyallylics, polycellulosics, polyepoxies, polyethylene vinyl alcohols, polyfluoro plastics, poly-furans, polyiononmers, polyketones, polyphenolics, polyamides, polycarbonates, polydicyclopentadienes, polyesters, polyimides, polyethylene, ethylene copolymers, polypheylenesulfide, polypropylene, polystyrene, styrene copolymers, polyurethanes, polysilicones, polysulfones; thermoplastic elastomers, and polyureas.

13. The method of claim 11 wherein the polymer solution is formed by using a solvent selected from the group comprised of water, tetrahydrofuran, alcohols, ketones, esters, chlorinated hydrocarbons, ethane, cyclohexane, hexane, benzene, styrene, dichlorobenzene, toluene, xylene, aldehydes, aqueous acids and bases.

14. The method of claim 13 further comprising the step of monitoring the temperature of the porous tubes and stopping the rotation of the tubular module after the temperature of the porous tubes substantially equals the ambient temperature.

15. The method of claim 11 wherein the polymer solution is formed by heating the polymer above its melting point.

16. The method of claim 11 wherein the porous tubes are comprised of a material selected from the group comprised of metals, ceramics, carbon, glass, plastics and polymers.

17. The method of claim 11 wherein the inside surface of the porous tubes has pores less than 1.0 $\mu$m in diameter.

18. The method of claim 11 wherein the rotation speed of the tubular module is less than 10 revolutions per minute.

19. The method of claim 11 wherein the polymer film coating on the inside of the porous tubes has a uniform thickness in the range of 0.5 µm to 200 µm.

20. The method of claim 11 wherein the polymer film coating on the inside of the porous tubes has a uniform thickness in the range of 20 µm to 50 µm.

21. A permeate filter system prepared by a process comprising the steps of:

(a) forming a polymer solution;

(b) pouring the polymer solution into a plurality of porous tubes comprising a tubular module, each of said porous tubes having a cap at one end;

(c) capping the other end of each of the porous tubes so that the ends of the tube are sealed from the ambient environment;

(d) aligning the longitudinal axis of the tubular module in a substantially horizontal position;

(e) rotating the aligned tubular module about its longitudinal axis at a speed of less than 60 revolutions per minute so that the polymer solution solvent evaporates through the porous wall tubes to provide a polymer film having a uniform thickness on the inside surface of the porous wall tubes, the polymer film and porous wall tubes thereby constituting the permeate filter system;

(f) removing the caps at each end of each of the porous tubes.

22. The permeate filter system of claim 21 wherein the polymer is selected from the group comprised of polyphosphazenes, polyacetals, polyacrylics, polyacrylonitriles, polyallylics, polycellulosics, polyepoxies, polyethylene vinyl alcohols, polyfluoro plastics, poly-furans, polyiononmers, polyketones, polyphenolics, polyamides, polycarbonates, polydicyclopentadienes, polyesters, polyimides, polyethylene, ethylene copolymers; polypheylenesulfide, polypropylene, polystyrene, styrene copolymers, polyurethanes, polysilicones, polysulfones; thermoplastic elastomers, and polyureas.

23. The permeate filter system of claim 21 wherein the polymer solution is formed by using a solvent selected from the group comprised of water, tetrahydrofuran, alcohols, ketones, esters, chlorinated hydrocarbons, ethane, cyclohexane, hexane, benzene, styrene, dichlorobenzene, toluene, xylene, aldehydes, aqueous acids and bases.

24. The permeate filter system of claim 21 further comprising the step of monitoring the temperature of the porous tubes and stopping the rotation of the tubular module after the temperature of the porous tubes substantially equals the ambient temperature.

25. The permeate filter system of claim 21 wherein the polymer solution is formed by heating the polymer above its melting point.

26. The permeate filter system of claim 21 wherein the porous tube is comprised of a material selected from the group comprised of metals, ceramics, carbon, glass, plastics and polymers.

27. The permeate filter system of claim 21 wherein the inside surface of the porous tubes comprising the tubular module have pores less than 1.0 µm in diameter.

28. The permeate filter system of claim 21 wherein the rotation speed of the tubular module is less than 10 revolutions per minute.

29. The permeate filter system of claim 21 wherein the polymer film coating on the inside surface of each of the porous tubes comprising the tubular module have a uniform thickness in the range of 0.5 µm to 200 µm.

30. The permeate filter system of claim 21 wherein the polymer film coating on the inside surface of each of the porous tubes comprising the tubular module have a uniform thickness in the range of 20 µm to 50 µm.

* * * * *